United States Patent [19]

Gerben et al.

[11] Patent Number: 4,532,820

[45] Date of Patent: Aug. 6, 1985

[54] MOTION MULTIPLIER APPARATUS

[75] Inventors: Ralph D. Gerben, Glen Burnie; Harry J. Walters, Fallston, both of Md.

[73] Assignee: M. S. Willett, Inc., Cockeysville, Md.

[21] Appl. No.: 167,284

[22] Filed: Jul. 9, 1980

Related U.S. Application Data

[62] Division of Ser. No. 919,591, Jun. 28, 1978, Pat. No. 4,256,218.

[51] Int. Cl.³ .................... F16H 25/12; F16H 21/44
[52] U.S. Cl. .................................... 74/56; 74/109; 74/110
[58] Field of Search .................... 74/56, 104, 109, 110

[56] References Cited

U.S. PATENT DOCUMENTS

| | | | |
|---|---|---|---|
| 2,664,191 | 12/1953 | May | 74/110 |
| 2,683,992 | 7/1954 | Price | 74/110 |
| 3,135,395 | 6/1964 | Wallis . | |
| 3,220,267 | 11/1965 | Smith | 74/110 |
| 3,374,684 | 3/1968 | Greven | 74/56 |
| 3,521,761 | 7/1970 | Wallis . | |
| 3,528,575 | 9/1970 | McCaughey . | |
| 3,620,381 | 11/1971 | McCaughey . | |
| 3,655,070 | 4/1972 | Haydu . | |
| 3,753,489 | 8/1973 | Tomioka et al. . | |
| 3,756,425 | 9/1973 | Wallis . | |
| 3,910,422 | 10/1975 | Zierpka . | |
| 4,032,018 | 6/1977 | Wallis . | |

FOREIGN PATENT DOCUMENTS

| | | | |
|---|---|---|---|
| 2057749 | 6/1972 | Fed. Rep. of Germany | 74/56 |
| 563222 | 8/1977 | U.S.S.R. | 74/109 |

OTHER PUBLICATIONS

*Ingenious Mechanisms for Designers & Inventors*, vol. II, 11th edition, The Industrial Press, copyright 1936.

*Primary Examiner*—Lawrence J. Staab
*Attorney, Agent, or Firm*—James C. Wray

[57] ABSTRACT

Slidably mounted blocks with toothed wheels supporting arms of various radial extension provide variable travel distances for the gripper bar when moving in the transfer direction.

1 Claim, 3 Drawing Figures

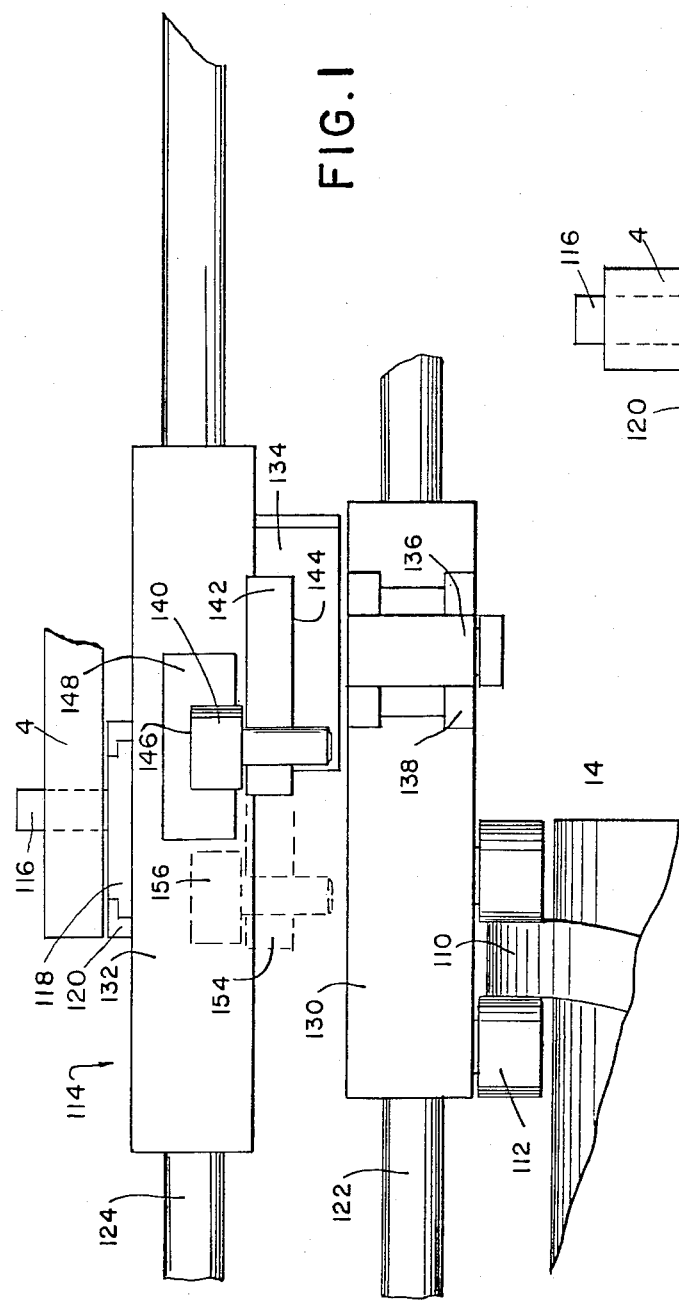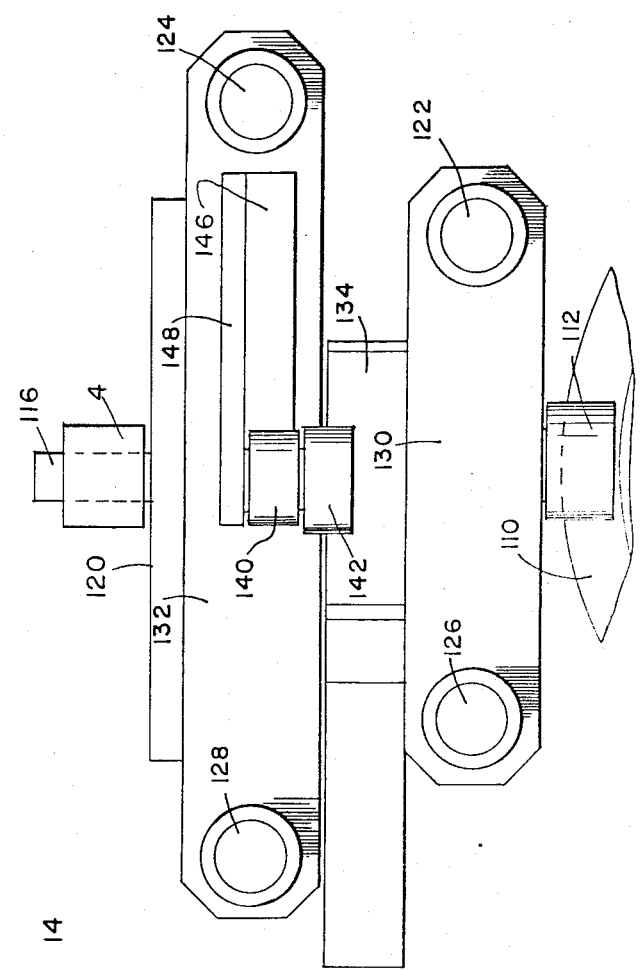

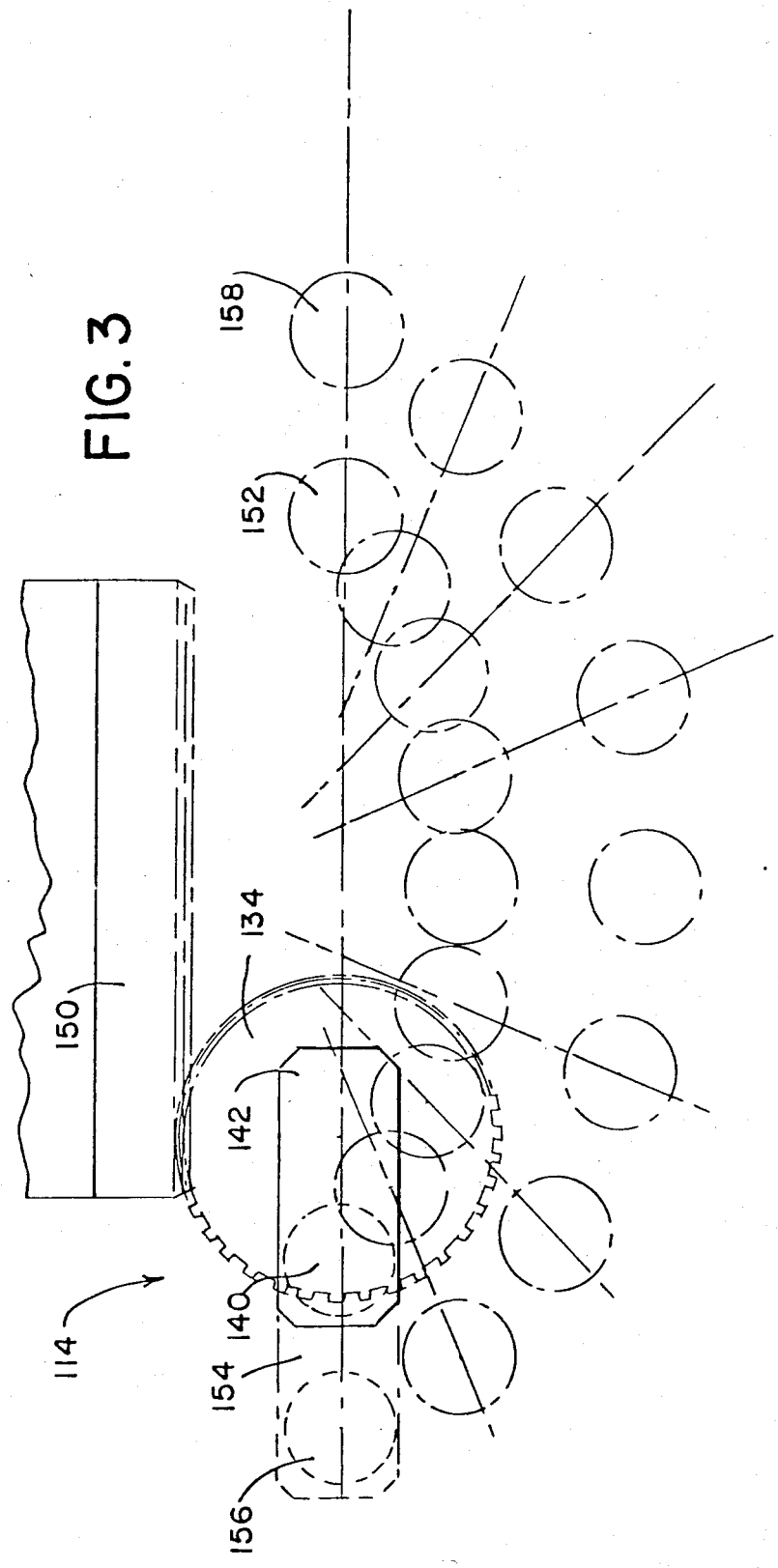

4,532,820

MOTION MULTIPLIER APPARATUS

This is a divisional application of application Ser. No. 919,591 filed June 28, 1978, now U.S. Pat. No. 4,256,218.

DESCRIPTION OF THE PRIOR ART

Many problems remain the prior art devices. One problem is the lack of any convenient means for varying and multiplying travel distance of a driven device. Such a feature is essential for adapting leaves in apparatus to different assembly processes and work station arrangements. Another problem is the lack of a system travel multiplying component which performs reliably, is constructed easily and can be readily adapted and designed to multiply motion in any desired degree.

SUMMARY OF THE INVENTION

The present invention overcomes the problems which exist in the prior are devices. The present invention provides, in preferred form, a transfer having gripper bars capable of grasping, lifting and transferring a work piece. The grasping and lifting motions are actuated by face cams. The face cams act through linkages connected to rotatable rods having arms connected to the gripper bars. Cam grooves formed in the face cams determine the manner in which the gripper bars move in the grasping and lifting directions. The translational motion is actuated by a barrel cam having an axial curved cam rim positioned between cam followers. Slidably mounted blocks with toothed wheels support arms of various radial extension to provide variable travel distances to driven devices.

BRIEF DESCRIPTION OF THE DRAWINGS

FIG. 1 is a cross sectional side elevation of the transfer multiplier assembly.

FIG. 2 is a cross sectional end view of the transfer multiplier assembly shown in FIG. 1.

FIG. 3 is a sectional plan view of the transfer multiplier assembly shown in FIG. 1 showing the travel path of two inserts with different lengths usable with the transfer multiplier assembly.

DETAILED DESCRIPTION OF THE DRAWINGS

The axial feed motion system is actuated by a barrel cam 14. The cam 14 is provided with an axial curve cam ridge 110 positioned between cam followers 112 connected to a transverse multiplier assembly 114. Posts 116 mounted on the upper surface of the multiplier assembly 114 project through holes formed in one end of the gripper bars 4. The bases of the posts 116 have outwardly extending flanges 118 held against the multiplier assembly 114 by L-brackets 120. The posts 116 are thus free to move transversely with respect to the transfer multiplier assembly 114 and the transport path. The posts 116 are loosely received by the holes in gripper bars 4 to permit the gripper bars 4 to move vertically with respect to the transfer multiplier assembly 114 and transport path.

The transfer multiplier assembly 114 as shown in detail in FIGS. 1-3. Spaced paralled guide rods 122, 124, 126 and 128 are supported by a chassis (not shown). A lower block 130 is slidably mounted on the lower guide rods 122 and 126 and an upper block 132 is slidably mounted on the upper guide rods 124 and 128. The gripper bar engaging posts 116 are mounted on the upper surface of the upper block 132. The guide rods 122, 124, 126 and 128 are oriented to permit the blocks 130 and 132 to move axially with respect to the transport path. A toothed wheel 134 has a shaft 136 journaled for rotation in a bearing 138 mounted in the lower block 130. A follower 140 is mounted on the radially outward end of an insert 142 which is removably held within a notch 144 formed in the toothed wheel 134. The follower 140 is received in a transverse channel 146 formed in the bottom of a bearing insert 148 mounted in the upper block 132. A stationary rack 150 operatively engages the toothed wheel 134.

The operation of the transfer multiplier assembly 114 is best understood by reference to FIGS. 1 and 3. As the lower block 130 is moved axially along the lower guide rods 122 and 126, the rack 150 acts on the toothed wheel 134 causing the wheel 134 to rotate. Since the follower 140 is held radially outwardly from the axis of rotation of the toothed wheel 134, the follower 140 moves in the arcuate path 152 shown in FIG. 3. The movement of the follower 140 in the transverse channel 146 causes the upper block 132 to slide axially along the upper guide rods 124 and 128.

The axial travel distance of the upper block 132 is increased by replacing the insert 142 with a similar insert 154 having an increased radial length. The follower 156 is held by the replacement insert 154 a greater distance from the axis of rotation of the toothed wheel 144 than the follower 140 is held by the insert 142. Movement of the lower block 130 along the lower guide rods 122 and 126 causes the replacement follower 156 to move in the arcuate path 158 shown in FIG. 3. The arcuate path 158 has a greater radius than the arcuate path 152. Consequently, the axial travel distance of the upper block 132 is increased without any increase in the axial travel distance of the lower block 130.

The operation of the entire axial feed motion system can now be readily understood. As the barrel cam 14 is rotated, the cam ridge 110 acts on the cam followers 112 and moves the lower block 130 along the lower guide rods 122 and 126. The axial movement of the lower block 130 is communicated to the upper block 132 by the operation of the transfer multiplier assembly just described.

While the invention has been described with reference to a specific embodiment, the exact nature and scope of the invention is defined in the claims which follow.

What is claimed is:

1. Motion multiplier apparatus comprising
   spaced parallel stationary rods,
   parallel blocks mounted on the rods for axial movement with respect to the rods,
   a toothed wheel rotatably mounted on one of the blocks
   a stationary rack mounted parallel to the rods and engaging the toothed wheel,
   an arm removably held in a radial notch in an end face of the toothed wheel and terminating radially outwardly beyond the toothed wheel in a follower positioned for movement within a transverse channel formed in the other of the blocks
   said other of the blocks connected to a device for imparting movement to the device,
   and cam means driveably connected to the block mounting the toothed wheel for imparting sufficient axial movement to said block to move said arm through about a 180° arc from a first position substantially parallel to the rods to a second position substantially parallel to the rods,
said cam means comprising a barrel cam having an axial curve cam ridge on an outer surface, said ridge positioned between cam followers connected to the block mounting the toothed wheel.

* * * * *

UNITED STATES PATENT OFFICE
CERTIFICATE OF CORRECTION

Patent No. 4,532,820　　　　　　　　　　Dated August 6, 1985

Inventor(s) Ralph D. Gerben and Harry J. Walters

It is certified that error appears in the above-identified patent and that said Letters Patent are hereby corrected as shown below:

Column 2, line 30, change "144" to --134--.

Signed and Sealed this

Twenty-second Day of April 1986

[SEAL]

Attest:

DONALD J. QUIGG

Attesting Officer　　　Commissioner of Patents and Trademarks